United States Patent
Hu et al.

(10) Patent No.: US 11,882,047 B2
(45) Date of Patent: Jan. 23, 2024

(54) TRAFFIC CLASSIFICATION METHOD AND APPARATUS

(71) Applicant: Huawei Technologies Co., Ltd., Guangdong (CN)

(72) Inventors: Jing Hu, Beijing (CN); Shuzhen Tian, Beijing (CN); Zhengyi Zhang, Beijing (CN)

(73) Assignee: HUAWEI TECHNOLOGIES CO., LTD., Guangdong (CN)

( * ) Notice: Subject to any disclaimer, the term of this patent is extended or adjusted under 35 U.S.C. 154(b) by 319 days.

(21) Appl. No.: 17/469,219

(22) Filed: Sep. 8, 2021

(65) Prior Publication Data

US 2021/0409337 A1  Dec. 30, 2021

Related U.S. Application Data

(63) Continuation of application No. PCT/CN2020/081113, filed on Mar. 25, 2020.

(30) Foreign Application Priority Data

Apr. 12, 2019  (CN) .......................... 201910294640.0

(51) Int. Cl.
 *H04L 47/2441* (2022.01)
 *H04L 47/20* (2022.01)
 *H04L 47/2483* (2022.01)

(52) U.S. Cl.
 CPC .......... *H04L 47/2441* (2013.01); *H04L 47/20* (2013.01); *H04L 47/2483* (2013.01)

(58) Field of Classification Search
 None
 See application file for complete search history.

(56) References Cited

U.S. PATENT DOCUMENTS 6,975,592 B1   12/2005  Seddigh et al.
8,937,952 B2 *  1/2015  Goyal ..................... H04L 69/02
                                                370/392

(Continued)

FOREIGN PATENT DOCUMENTS

CN       1905523 A    1/2007
CN     101510723 A    8/2009

(Continued)

OTHER PUBLICATIONS

Wang Yixuan, Research on Traffic Classification Mrthod and Traffic Characteristics Analysis, 2015, 2 pages(abstract).

(Continued)

*Primary Examiner* — Brian S Roberts
(74) *Attorney, Agent, or Firm* — WOMBLE BOND DICKINSON (US) LLP

(57) ABSTRACT

This application provides a traffic classification method and apparatus. The method includes: determining, based on distribution characteristics of concerned bits of a plurality of rules in a first rule set, an effective bit corresponding to the first rule set; determining a hash key value of each rule based on a value of the effective bit of each rule in the first rule set, and storing each rule in the first rule set in at least one of S storage units based on the hash key value, where the first rule set is any one of N rule sets, the N rule sets are stored in the S storage units; and when traffic classification is performed, searching for a corresponding rule in each of the S storage units based on a hash key value of a search key.

18 Claims, 5 Drawing Sheets

200

Determine, based on distribution characteristics of concerned bits of a plurality of rules in a first rule set, an effective bit corresponding to the first rule set, where the effective bit includes a bit on which values used to distinguish different rules in the plurality of rules are located  — 210

Determine a hash key value of each rule based on a value of the effective bit of each rule in the first rule set, and store each rule in the first rule set in at least one of S storage units based on the hash key value, where the first rule set is any one of N rule sets, the N rule sets are stored in the S storage units, N and S are integers greater than or equal to 1, and effective bits of rules stored in each of the S storage units are the same  — 220

When traffic classification is performed, search for a corresponding rule in each of the S storage units based on a hash key value of a search key  — 230

(56) References Cited

U.S. PATENT DOCUMENTS

| | | | |
|---|---|---|---|
| 9,928,292 | B2 | 3/2018 | Sreenivas Prasad |
| 10,044,620 | B2 | 8/2018 | Dillon |
| 2005/0254502 | A1 | 11/2005 | Choi |
| 2012/0079101 | A1 | 3/2012 | Muppala et al. |
| 2017/0171362 | A1 | 6/2017 | Bolotov et al. |
| 2017/0337258 | A1 | 11/2017 | Sreenivas Prasad |
| 2018/0107759 | A1* | 4/2018 | Cheng .................. G06F 16/285 |
| 2019/0238458 | A1* | 8/2019 | Pongracz .............. H04L 45/745 |
| 2021/0367887 | A1* | 11/2021 | Wang ..................... H04L 61/10 |

FOREIGN PATENT DOCUMENTS

| | | | |
|---|---|---|---|
| CN | 101753445 | A | 6/2010 |
| CN | 102377581 | A | 3/2012 |
| CN | 104462144 | A | 3/2015 |
| CN | 104468381 | A | 3/2015 |
| CN | 105593854 | A | 5/2016 |
| CN | 106326234 | A | 1/2017 |
| EP | 3276501 | A1 | 1/2018 |
| JP | 2018033017 | A | 3/2018 |
| KR | 20160035793 | A | 4/2016 |
| WO | 2016056217 | A1 | 4/2016 |
| WO | 2018132196 | A1 | 7/2018 |

OTHER PUBLICATIONS

Huang Jun-yi et al, Analysis of Feature Selection Effect on IP Traffic Classification Algorithms, 2010, 3 pages.

* cited by examiner

|  | IP field | Port field | Binary bitmap |
|---|---|---|---|
| Rule 1 | 255.*.*.* | 80 | 1 1 1 1 1 1 1 1 * * * * * * * * * * * * * * * * * * * * * * * * 0 1 0 1 0 0 0 0 |
| Rule 2 | 127.8.*.* | 80 | 0 1 1 1 1 1 1 1 0 0 0 0 1 0 0 0 * * * * * * * * * * * * * * * * 0 1 0 1 0 0 0 0 |
| Rule 3 | 10.22.132.* | 80 | 0 0 0 0 1 0 1 0 0 0 0 1 0 1 1 0 1 0 0 0 0 1 0 0 * * * * * * * * 0 1 0 1 0 0 0 0 |
| Rule 4 | 10.33.5.* | * | 0 0 0 0 1 0 1 0 0 0 1 0 0 0 0 1 0 0 0 0 0 1 0 1 * * * * * * * * * * * * * * * * |
| Rule 5 | 10.116.7.0 | * | 0 0 0 0 1 0 1 0 0 1 1 1 0 1 0 0 0 0 0 0 0 1 1 1 0 0 0 0 0 0 0 0 * * * * * * * * |
| Rule 6 | 10.72.2.64 | 80 | 0 0 0 0 1 0 1 0 0 1 0 0 1 0 0 0 0 0 0 0 0 1 0 0 1 0 0 0 0 0 0 0 0 1 0 1 0 0 0 0 |

FIG. 1

| Mask type | Binary bitmap |
|---|---|
| Mask 1 | 1 1 1 1 1 1 1 1 0 0 0 0 0 0 0 0 0 0 0 0 0 0 0 0 0 0 0 0 0 0 0 0 1 1 1 1 1 1 1 1 |
| Mask 2 | 1 1 1 1 1 1 1 1 1 1 1 1 1 1 1 1 0 0 0 0 0 0 0 0 0 0 0 0 0 0 0 0 1 1 1 1 1 1 1 1 |
| Mask 3 | 1 1 1 1 1 1 1 1 1 1 1 1 1 1 1 1 1 1 1 1 1 1 1 1 0 0 0 0 0 0 0 0 1 1 1 1 1 1 1 1 |
| Mask 4 | 1 1 1 1 1 1 1 1 1 1 1 1 1 1 1 1 1 1 1 1 1 1 1 1 0 0 0 0 0 0 0 0 0 0 0 0 0 0 0 0 |
| Mask 5 | 1 1 1 1 1 1 1 1 1 1 1 1 1 1 1 1 1 1 1 1 1 1 1 1 1 1 1 1 1 1 1 1 0 0 0 0 0 0 0 0 |
| Mask 6 | 1 1 1 1 1 1 1 1 1 1 1 1 1 1 1 1 1 1 1 1 1 1 1 1 1 1 1 1 1 1 1 1 1 1 1 1 1 1 1 1 |

FIG. 2

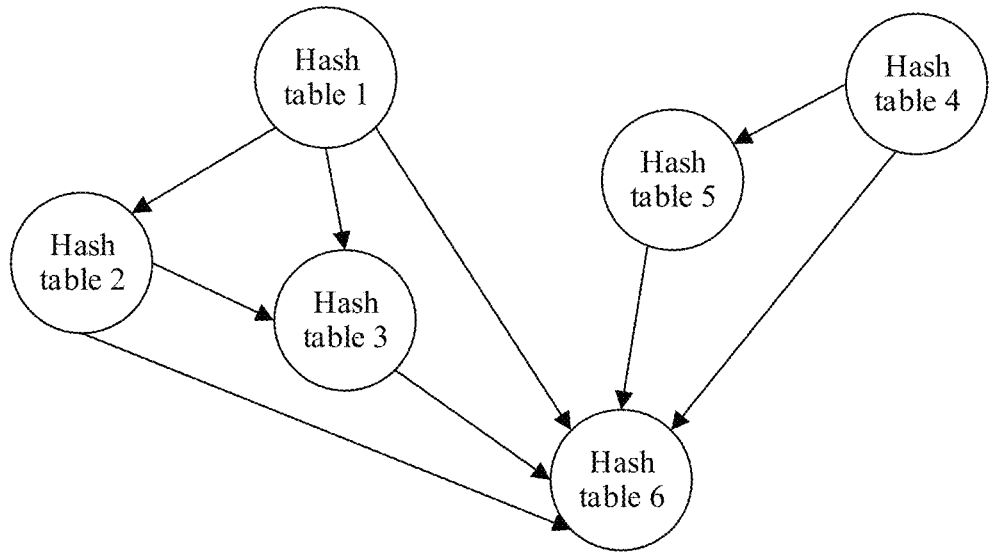

Determine, based on distribution characteristics of concerned bits of a plurality of rules in a first rule set, an effective bit corresponding to the first rule set, where the effective bit includes a bit on which values used to distinguish different rules in the plurality of rules are located — 210

Determine a hash key value of each rule based on a value of the effective bit of each rule in the first rule set, and store each rule in the first rule set in at least one of S storage units based on the hash key value, where the first rule set is any one of N rule sets, the N rule sets are stored in the S storage units, N and S are integers greater than or equal to 1, and effective bits of rules stored in each of the S storage units are the same — 220

When traffic classification is performed, search for a corresponding rule in each of the S storage units based on a hash key value of a search key — 230

FIG. 4

TRAFFIC CLASSIFICATION METHOD AND APPARATUS

CROSS-REFERENCE TO RELATED APPLICATIONS

This application is a continuation of International Application No. PCT/CN2020/081113, filed on Mar. 25, 2020, which claims priority to Chinese Patent Application No. 201910294640.0, filed on Apr. 12, 2019. The disclosures of the aforementioned applications are hereby incorporated by reference in their entireties.

TECHNICAL FIELD

This application relates to computer technologies, and in particular, to a traffic classification method and apparatus.

BACKGROUND

On a current network, a traffic classification function has become one of key functions of routers and switches, to provide the network with function characteristics such as packet filtering, quality of service (QoS), and traffic statistics collection. A principle of traffic classification is to extract information about each field in a packet header to construct a search key, and perform matching based on corresponding settings of each rule. If a setting of a rule is met, an action associated with the rule is executed. Each configured rule is associated with a piece of priority information. If a plurality of rules are matched, an action of a rule with a highest priority is performed.

Currently, widely used traffic classification solutions include a hardware solution based on a ternary content addressable memory (TCAM) and a rule set segmentation solution based on a decision tree algorithm. A basic idea of the decision tree algorithm for segmenting a rule set is to recursively segment the rule set based on characteristics of the rule set until a quantity of rules in each rule subset is less than a preset threshold. After segmentation, only one rule subset needs to be matched during traffic search. In this way, a quantity of rules to be matched can be greatly reduced, to implement a high-speed traffic search function. Currently, a decision tree-based preprocessing algorithm is widely used, where typical algorithms include HiCuts, HyperCuts, Modular, or the like.

At present, because a hash algorithm has extremely high insertion and search performance, the hash algorithm is used as a traffic classification search algorithm in related researches. A current hash algorithm-based traffic classification method may require a relatively large quantity of computing resources during rule insertion and search, but delivers low rule insertion and search efficiency.

SUMMARY

This application provides a traffic classification method and apparatus, which feature high search performance, low resource consumption, and a low search delay.

In some embodiments (sometimes referred to as, "a first aspect"), a traffic classification method is provided. The method may be performed (e.g., executed, implemented) by a network device, or may be performed by a chip or a circuit configured in a network device. This is not limited in this application. For example, the network device may be a router, a switch, or the like. This is not limited.

The method includes: determining (e.g., identifying, defining), based on distribution characteristics of concerned bits of a plurality of rules in a first rule set, an effective bit corresponding to the first rule set, where the effective bit includes a bit on which values used to distinguish different rules in the plurality of rules are located; determining a hash key value of each rule based on a value of the effective bit of each rule in the first rule set, and/or storing each rule in the first rule set in at least one of S storage units based on the hash key value, where the first rule set is any one of N rule sets, the N rule sets are stored in the S storage units, N and S are integers greater than or equal to 1, and/or effective bits of rules stored in each of the S storage units are the same; and/or when traffic classification is performed, searching (e.g., identifying, discovering, detecting) for a corresponding rule in each of the S storage units based on a hash key value of a search key.

In some embodiments, the effective bit includes the bit on which the values used to distinguish the different rules in the plurality of rules are located. The determining the effective bit corresponding to the first rule set may be understood as determining a common effective bit corresponding to a plurality of rules included in the first rule set, or may be understood as determining an effective bit of each rule in the first rule set, where the effective bits of all the rules are the same. In some embodiments, each rule includes a plurality of bits. An effective bit of the rule may be a bit that is "effective" in a next hash storage operation, and/or is a bit participating in the next hash storage operation. A hash storage operation is performed based on a value of the effective bit of the rule, and/or a value of a bit other than the effective bit of the rule does not participate in the next hash storage operation.

Distribution characteristics of a concerned bit may include a location characteristic of the concerned bit and/or a numerical characteristic of the concerned bit. The effective bit corresponding to the first rule set may be determined based on the distribution characteristics of the concerned bits of the plurality of rules in the first rule set. The effective bit includes a bit on which values used to distinguish different rules in the plurality of rules are located. For example, a basic determining principle may be: on the effective bit corresponding to the first rule set, values of different rules should have "uniqueness" as much as possible, that is, values of effective bits of different rules should be different from each other as much as possible. In this principle, at least one effective bit corresponding to the first rule set may be determined. It should be understood that effective bits may include a plurality of bits, and/or a quantity of effective bits may be reduced as much as possible on a premise that the values of the different rules should have the "uniqueness" as much as possible. This can reduce an operation amount of a next hash storage operation.

In some embodiments, an effective bit of a rule may include all or a part of concerned bits of the rule.

In some embodiments, an effective bit of a rule may include an unconcerned bit.

In some embodiments, values of different rules are different on an effective bit.

In some embodiments, values of a part of rules may be the same on an effective bit.

In the traffic classification method provided in this application, effective bits corresponding to different rule sets may be determined by using a rule set as a unit, hash storage is performed on rules based on values that are on the effective bits and/or that are of the rules in the rule set, and/or the rules are stored in a plurality of storage units. Therefore, the traffic classification method provided in this embodiment features high search performance, low resource consumption, and/or a low search delay.

In some embodiments, before the determining, based on distribution characteristics of concerned bits of a plurality of rules in a first rule set, an effective bit corresponding to the first rule set, the method includes: dividing, based on distribution characteristics of concerned bits of an initial rule set, the initial rule set into the N rule sets.

For example, rules that have concerned bits whose distribution characteristics are the same or similar may be grouped into a same rule set. This can help determine an effective bit corresponding to the rule set.

In some embodiments, the distribution characteristics of the concerned bits herein mainly relate to a quantity of the concerned bits and/or location characteristics, and/or that the distribution characteristics of the concerned bits are the same or similar mainly means that the quantities of the concerned bits and/or distribution locations of the concerned bits are the same or similar.

In some embodiments, the traffic classification method provided in this application, through a combination of a proper rule set division method and/or a proper effective bit selection method, can greatly reduce a rule extension problem caused by an unconcerned bit during rule insertion. In some embodiments, during the rule insertion, the rule extension needs to be performed based on only an effective bit of a current rule. This does not consume a relatively large quantity of computing resources and/or storage resources.

In some embodiments, if the first rule set has a plurality of rules corresponding to a same hash key value, the storing each rule in the first rule set in at least one of S storage units based on the hash key value includes: storing the plurality of rules corresponding to the same hash key value in different storage units. In some embodiments, through the foregoing settings, during hash search, it may be avoided to search for a plurality of slots in a same storage unit, especially when an address index of a rule in a rule table is stored in the slot. In this case, it may be avoided to search for the rule table in one storage unit for a plurality of times (e.g., a time period for searching for the rule table is relatively long). This can reduce a search delay and/or improve search efficiency.

In some embodiments, the S storage units are disposed in parallel. In this way, parallel search can be performed on the S storage units, to improve rule search efficiency.

In some embodiments, the S storage units may be disposed in series.

In some embodiments, each storage unit includes a hash table and/or a rule table, and/or the storing each rule in the first rule set in at least one of S storage units based on the hash key value includes: storing each rule in the first rule set in the rule table; and/or calculating, based on the hash key value of each rule, a storage location of each rule in the hash table, and/or storing an address index of each rule in the rule table in the storage location.

In some embodiments, the storing each rule in the first rule set in at least one of S storage units based on the hash key value includes: calculating fingerprint information of each rule based on the hash key value of each rule, and/or storing the fingerprint information of each rule in the storage location. The setting of the fingerprint information can reduce occurrence of a "hash conflict" problem, and/or improve accuracy and efficiency of rule matching.

In some embodiments (sometimes referred to as, "a second aspect"), a traffic classification apparatus is provided, including: a determining unit, configured to determine, based on distribution characteristics of concerned bits of a plurality of rules in a first rule set, an effective bit corresponding to the first rule set, where the effective bit includes a bit on which values used to distinguish different rules in the plurality of rules are located; a storage unit, configured to determine a hash key value of each rule based on a value of the effective bit of each rule in the first rule set, and/or store each rule in the first rule set in at least one of S storage units based on the hash key value, where the first rule set is any one of N rule sets, the N rule sets are stored in the S storage units, N and S are integers greater than or equal to 1, and/or effective bits of rules stored in each of the S storage units are the same; and/or a search unit, configured to, when traffic classification is performed, search for a corresponding rule in each of the S storage units based on a hash key value of a search key.

In some embodiments, the traffic classification apparatus may be a router or a switch.

In some embodiments, the apparatus includes a dividing unit that is configured to divide, based on distribution characteristics of concerned bits of an initial rule set, the initial rule set into the N rule sets.

In some embodiments, if the first rule set has a plurality of rules corresponding to a same hash key value, the storage unit is configured to store the plurality of rules corresponding to the same hash key value in different storage units.

In some embodiments, the S storage units are disposed in parallel.

In some embodiments, each storage unit includes a hash table and/or a rule table, and/or the storage unit is configured to: store each rule in the first rule set in the rule table; and/or calculate, based on the hash key value of each rule, a storage location of each rule in the hash table, and/or store an address index of each rule in the rule table in the storage location.

In some embodiments, the storage unit is configured to calculate fingerprint information of each rule based on the hash key value of each rule, and/or store the fingerprint information of each rule in the storage location.

In some embodiments (sometimes referred to as, "a third aspect"), a traffic classification apparatus is provided, including a memory, a processor, and a communications interface. The memory is configured to store a computer program, and the processor is configured to invoke the computer program from the memory and run the computer program, so that the traffic classification apparatus performs the method according to the first aspect or any possible implementation of the first aspect.

In some embodiments, the traffic classification apparatus may be a router or a switch.

In some embodiments (sometimes referred to as, "a fourth aspect"), a computer program product is provided. The computer program product includes a computer program (e.g., which may also be referred to as code or an instruction). When the computer program is run on a computer, the computer is enabled to perform the method according to the first aspect or any possible implementation of the first aspect.

In some embodiments (sometimes referred to as, "a fifth aspect"), a computer-readable storage medium is provided. The computer-readable storage medium is configured to store a computer program, and the computer program includes instructions used to perform the method according to the first aspect or any possible implementation of the first aspect.

In some embodiments (sometimes referred to as, "a sixth aspect"), a chip system is provided. The chip system includes a memory and a processor. The memory is configured to store a computer program. The processor is configured to invoke the computer program from the memory and run the computer program, so that a network device on which the chip system is installed performs the method according to the first aspect or any possible implementation of the first aspect.

The chip system may include an input circuit or interface configured to send information or data, and/or an output circuit or interface configured to receive information or data.

BRIEF DESCRIPTION OF DRAWINGS

FIG. 1 is a schematic diagram of an example of a rule corresponding to a hash table forest algorithm, according to some embodiments;

FIG. 2 shows masks corresponding to the rules in FIG. 1, according to some embodiments;

FIG. 3 is a schematic diagram of a directed graph between hash tables in a hash table forest algorithm, according to some embodiments;

FIG. 4 is a schematic flowchart of a traffic classification method according to some embodiments;

DESCRIPTION OF EMBODIMENTS

Figure 5:
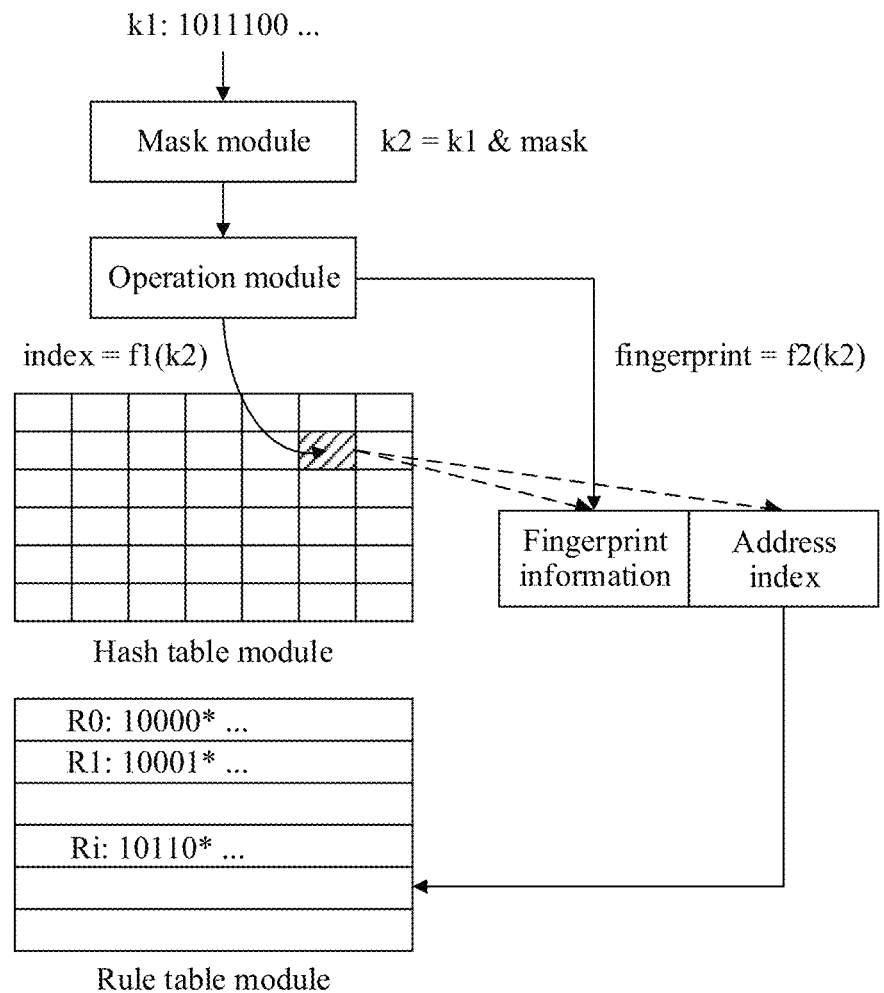
FIG. 5 is a logical structural diagram of a hash algorithm unit according to some embodiments.

To facilitate understanding of the embodiments of this application, concepts in this application are first briefly described.

In some embodiments, traffic classification defines some rules based on some packet characteristics, and uses these rules to identify packets that meet a type of characteristics, to classify the packets. A plurality of packets that match a specific rule constitute a piece of traffic. On a current network, a traffic classification function has become one of key functions of routers and switches, to provide the network with function characteristics such as packet filtering, quality of service, and traffic statistics collection. A principle of traffic classification is to extract information about each field in a packet header to construct a search key, and perform matching based on corresponding settings of each rule. If a setting of a rule is met, an action associated with the rule is executed. Each configured rule is associated with a piece of priority information. If a plurality of rules are matched, an action of a rule with a highest priority is performed.

In some embodiments, traffic classification requires that matching is performed on each configured rule. However, sequential matching may cause an extremely large calculation amount and/or delay. Currently, widely used solutions include a hardware solution based on a ternary content addressable memory and a rule set segmentation solution based on a decision tree algorithm. In the TCAM-based hardware solution, dedicated hardware is designed to implement parallel matching on all rules, to achieve a high-performance traffic search capability. A TCAM is used in a high-end router and a switch based on advantages of the TCAM, such as high-speed traffic classification performance and simple resource management. However, the TCAM has problems such as high costs and high power consumption, which limits further application of the TCAM.

In some embodiments, a basic idea of the decision tree algorithm for segmenting a rule set is to recursively segment the rule set based on characteristics of the rule set until a quantity of rules in each rule subset is less than a preset threshold. In some embodiments, after segmentation, only one rule subset needs to be matched during traffic search. In some embodiments, a quantity of rules to be matched can be greatly reduced, to implement a high-speed traffic search function. In some embodiments, a segmentation process is a process of establishing a decision tree. In some embodiments, each leaf node of the decision tree corresponds to a rule subset obtained after segmentation. In some embodiments, during traffic matching, a leaf node corresponding to a current traffic is first found based on a tree structure of a decision tree, and one-to-one matching is performed between a piece of traffic and a rule subset corresponding to the leaf node. Currently, a decision tree-based preprocessing algorithm is widely used, where typical algorithms include HiCuts, HyperCuts, Modular, or the like.

In some embodiments, HiCuts and HyperCuts methods study a traffic classification problem from a geometric point of view. From a geometric point of view, if rules in a traffic classifier are formed by n fields that respectively correspond to n-dimensional space, each rule corresponds to one "hyperrectangle" region in the n-dimensional space, and each packet corresponds to a point in the n-dimensional space. In some embodiments, a process of searching for a rule that matches a packet is equivalent to calculating a "hyperrectangle" into which a point corresponding to the packet falls. In the HiCuts and HyperCuts methods, each field in a rule is considered as a range, and fields in different ranges are put together for segmentation, to divide a rule set into small rule subsets. In some embodiments, when a quantity of rules in a rule subset is less than the preset threshold, the segmentation is terminated. A decision tree can be created through segmentation. In some embodiments, an intermediate node of the decision tree stores segmentation method-associated information such as one or more dimensions selected for segmentation, a quantity of segmentation times in each dimension, and a rule subset stored in a leaf node.

In the Modular algorithm, each field of each rule is encoded with "0" or "1", and each rule may include a plurality of bits. Each bit is "0", "1", or a wildcard. The wildcard may be represented by "*", indicating that a current bit of the rule can simultaneously match "0" and "1" of corresponding bits of a search key.

In some embodiments, when a rule set is segmented into a plurality of rule subsets, a quantity of "0"s, "1"s, or wildcards on a plurality of bits corresponding to a location in the rule set needs to be calculated, and according to a specific algorithm, the location is selected for segmenting the rule set. In some embodiments, different from the HiCuts and HyperCuts methods, the Modular algorithm may perform segmentation on the rule set by selecting a location. In some embodiments, after a reference location on which the rule set is segmented is selected, in a plurality of rules included in the rule set, a rule whose reference location is "0" is put into a rule subset. In some embodiments, in the plurality of rules included in the rule set, a rule whose reference location is "1" is put into another rule subset. In the plurality of rules included in the rule set, a rule whose reference location is "*" is put into the foregoing two rule subsets.

If a rule includes k "*"s, the rule can be extended to $2^k$ rules.

For example, a rule 100110** may be extended to four rules, namely, rules 10011000, 10011001, 10011010, and 10011011.

Bits on which "0" and "1" are located may be referred to as "concern bits". When a piece of traffic matches a rule, these bits of the traffic need to exactly match the rule. A bit on which "*" is located may be referred to as an "unconcerned bit". When the traffic matches the rule, there is no requirement on this bit of the traffic.

For another example, a field 127.8.0.0/16 in an IP range may be represented as 01111111 00001000 ****** ******. A total of 16 concerned bits (e.g., the first 16 bits) are included. When a piece of traffic matches a rule, these bits of the traffic need to exactly match the rule. The other 16 bits (e.g., the last 16 bits) are unconcerned bits. When a piece of traffic matches a rule, there is no requirement on these bits.

In some embodiments, for ease of representation, a rule may be stored in a format of value+mask, for example, 01111111 00001000 ****** **** (value)+11111111 11111111 00000000 00000000 (mask). That a mask bit is '1' indicates that a corresponding bit of the rule is a concerned bit, and that a mask bit is '0' indicates that a corresponding bit of the rule is an unconcerned bit. In some embodiments, for the foregoing rule 100110, a corresponding mask is 11111100.

A hash table (sometimes referred to as a hash map) is a data structure for implementing an associative array, and is widely used for quick data search. The hash table has two major operations. One operation is a write (e.g., put) operation by which an element is inserted into the hash table. The other operation is a read (e.g., get) operation by which an element is quickly found from the hash table.

The hash table is a data structure that is directly accessed based on a key value. That is, a record is accessed by mapping a key value to a location in the table, to increase a search speed. This mapping function is a hash function, and an array for storing the record is a hash table. If a key value is k, the key value is stored in a storage location of f(k) in the hash table, where f is a hash function.

Because a hash algorithm provides extremely high insertion and search performance, the hash algorithm may be used as a traffic classification search algorithm. The hash algorithm can effectively resolve the traffic classification problem when all bits in a rule are concerned bits, to achieve high traffic search performance. However, when an unconcerned bit exists in the rule, one rule can correspond to a plurality of search keys. For example, a rule 127.8.0.0/16 (01111111 00001000 ****** ******) can correspond to $2^{16}$ search keys. In some embodiments, the traffic search requires that this rule can be found by using all the $2^{16}$ search keys. Therefore, the foregoing rule needs to be extended to $2^{16}$ rules, and the $2^{16}$ rules are inserted into the hash table one by one. Consequently, a large quantity of computing resources and storage resources need to be consumed.

The following describes an example of a traffic classification search algorithm with reference to FIG. 1 to FIG. 3.

A hash algorithm provides extremely high performance when performing set insertion and search. Considering that a single hash table is difficult to process an unconcerned bit, a hash table forest algorithm may be used to construct a hash table for each type of mask in a rule set. In some embodiments, a directed graph is formed according to a coverage relationship between masks corresponding to all hash tables, to guide a search traffic of a search key.

FIG. 1 is a schematic diagram of an example of a rule corresponding to a hash table forest algorithm, according to some embodiments.

In FIG. 1, six rules are included in total, that is, a rule 1 to a rule 6. Each rule includes an IP field and a port field, and distribution of unconcerned bits in each rule is different. For the rule 1, the last 24 bits in the IP field are unconcerned bits. For the rule 2, the last 16 bits in the IP field are unconcerned bits. For the rule 3, the last eight bits in the IP field are unconcerned bits. For the rule 4, the last eight bits in the IP field and all of eight bits in the port field are unconcerned bits. For the rule 5, all of eight bits in the port field are unconcerned bits. For the rule 6, no unconcerned bit exists, and all bits are concerned bits.

A quantity of corresponding mask types may be determined based on distribution statuses of the unconcerned bits in the rules shown in FIG. 1. Because the distribution statuses of the unconcerned bits in the six rules in FIG. 1 are different from each other, the six rules in FIG. 1 correspond to six mask types in total. FIG. 2 shows the six mask types corresponding to the six rules in FIG. 1, according to some embodiments.

In some embodiments, during actual application, a rule set may include a plurality of other rules. In this embodiment, it is assumed that mask types corresponding to the foregoing plurality of other rules are all included in the foregoing six mask types. In other words, in the rule set, masks corresponding to a plurality of rules including the rule 1 may be a mask 1 in FIG. 2. In this case, the plurality of rules corresponding to the mask 1 may be stored in a hash table 1. In some embodiments, a plurality of rules corresponding to masks 2 to 6 may be respectively stored in hash tables 2 to 6. Herein, for ease of description, a set formed by the plurality of rules corresponding to the mask 1 may be referred to as a rule set 1, and sets formed by the plurality of rules corresponding to the masks 2 to 6 are respectively referred to as rule sets 2 to 6.

Considering that each search key does not need to be searched for in each hash table, a directed graph may be formed according to a coverage relationship between masks corresponding to each of the foregoing six hash tables, to guide a search traffic of a search key. FIG. 3 is a schematic diagram of a directed graph between hash tables in a hash table forest algorithm, according to some embodiments.

In some embodiments, in FIG. 3, for each rule, an insertion operation needs to be performed on all passed hash tables from root nodes in sequence. In some embodiments, the hash table 1 needs to store the plurality of rules in the rule set 1. In some embodiments, a plurality of rules in the rule sets 2, 3, and 6 need to be inserted into the hash table 1. During insertion, a bitwise AND (&) operation is separately performed on the plurality of rules in the rule set 1 and the mask 1, and a hash operation is performed based on a value of a concerned bit that is not masked, to calculate a storage location in the hash table 1. In some embodiments, a corresponding rule may be stored at the storage location. In some embodiments, for the plurality of rules in each of the rule sets 2, 3, and 6, a bitwise AND operation is performed on the plurality of rules and the mask 1, and a hash operation is performed based on a value of a concerned bit that is not masked, to calculate a storage location in the hash table 1. Subsequently, pointer (directory) information of a corresponding rule may be stored at the storage location, and the pointer information points to a next hash table passed by the rule.

For example, for the rule 6, not only the rule 6 needs to be stored in the hash table 6, but also the rule 6 needs to be inserted into the hash tables 1 to 5. A bitwise AND operation may be separately performed on the rule 6 and the masks 1 to 5 corresponding to the hash tables 1 to 5, to calculate storage locations in the hash tables 1 to 5. Subsequently, pointer information may be stored at each of the storage locations, and the pointer information points to a next hash table, for example, the hash table 6, passed by the rule 6.

When rule search is performed, searching for a search key first starts from all root nodes of a hash table forest, for example, the hash table 1 and the hash table 4. In some embodiments, during search of each hash table, a bitwise AND operation is first performed on a mask corresponding to the hash table and a current search key, to obtain a key value of the current hash table, and whether the key value is in the current hash table is determined. If the key value is not in the current hash table, a traffic search process ends. If the key value is in the current hash table, rule matching is performed. If the rule matching fails, the search process ends. If the rule matching succeeds, whether a pointer exists at a storage location is determined, and whether the pointer points to a next hash table is checked. If there is no pointer, that is, no next hash table needs to be searched, a matched rule with a highest priority is returned. If the search needs to be continued, search of a next hash table is continued.

According to the traffic classification search algorithm provided in FIG. 1 to FIG. 3, the construction of a hash table forest and the rule search may require a relatively large calculation amount. For each inserted rule, an insertion operation needs to be performed on all passed hash tables from root nodes in sequence. During the rule search, all root nodes need to be searched for. Consequently, a search delay may be relatively large, and efficiency is low. In some embodiments, a quantity of the root nodes of the hash table forest is dynamically variable, and a quantity of parallel search pipelines is variable. When the quantity of parallel search pipelines is relatively large, a relatively large quantity of search resources may need to be consumed.

To resolve the foregoing problem, an embodiment of this application provides another example of a traffic classification method, where the traffic classification method features high search performance, low resource consumption, and a low search delay.

FIG. 4 is a schematic flowchart of a traffic classification method 200 200 according to some embodiments. The traffic classification method 200 includes operations 210 to 230. The following describes the traffic classification method 200 with reference to FIG. 4.

Operation 210: Determine, based on distribution characteristics of concerned bits of a plurality of rules in a first rule set, an effective bit corresponding to the first rule set. The effective bit includes a bit on which values used to distinguish different rules in the plurality of rules are located.

Operation 220: Determine a hash key value of each rule based on a value of the effective bit of each rule in the first rule set, and store each rule in the first rule set in at least one of S storage units based on the hash key value, where the first rule set is any one of N rule sets, the N rule sets are stored in the S storage units, N and S are integers greater than or equal to 1, and effective bits of rules stored in each of the S storage units are the same.

Before traffic classification search is performed, each configured rule first needs to be stored for matching by a search key. Therefore, in operation 210 and operation 220, how to store each configured (e.g., to-be-matched) rule is first discussed. In this embodiment, storage performed on the rule mainly involves hash storage performed on the rule.

In some embodiments, a plurality of configured rules may be stored in a unit of a rule set. In some embodiments, a set formed by the plurality of configured rules may be referred to as an initial rule set. The initial rule set may be segmented into N rule sets, and the N rule sets are stored one by one.

The first rule set is any one of the N rule sets. The following uses the first rule set as an example to describe how to store the plurality of configured rules.

In some embodiments, the first rule set may include a plurality of rules, each rule includes a plurality of bits, and lengths of the plurality of rules may be the same (e.g., quantities of the included bits are the same). Each rule may include a concerned bit, and may include an unconcerned bit. An effective bit corresponding to the first rule set may be determined based on distribution characteristics of the concerned bits of the plurality of rules.

Herein, the effective bit includes a bit on which values used to distinguish different rules in the plurality of rules are located. The determining the effective bit corresponding to the first rule set may be understood as determining a common effective bit corresponding to a plurality of rules included in the first rule set, or may be understood as determining an effective bit of each rule in the first rule set, where the effective bits of all the rules are the same. Each rule usually includes a plurality of bits. An effective bit of the rule may be a bit that is "effective" in a next hash storage operation, and is a bit participating in the next hash storage operation. A hash storage operation is performed based on a value of the effective bit of the rule, and a value of a bit other than the effective bit of the rule does not participate in the next hash storage operation.

Distribution characteristics of a concerned bit may include a location characteristic of the concerned bit and a numerical characteristic of the concerned bit. The effective bit corresponding to the first rule set may be determined based on the distribution characteristics of the concerned bits of the plurality of rules in the first rule set. The effective bit includes a bit on which values used to distinguish different rules in the plurality of rules are located. For example, a basic determining principle may be: on the effective bit corresponding to the first rule set, values of different rules should have "uniqueness" as much as possible, that is, values of effective bits of different rules should be different from each other as much as possible. In this principle, at least one effective bit corresponding to the first rule set may be determined. It should be understood that effective bits may include a plurality of bits, and a quantity of effective bits may be reduced as much as possible on a premise that the values of the different rules should have the "uniqueness" as much as possible. This can reduce an operation amount of a next hash storage operation.

For example, the first rule set may include rules 101011, 011111, and 10010***. Based on the foregoing effective bit determining principle, for the first rule set including the foregoing three rules, the first bit to the third bit may be determined as effective bits corresponding to the first rule set. On the effective bits, values of the foregoing three rules are respectively 101, 011, and 100 that are different from each other and that have the "uniqueness". In some embodiments, if an operation amount of the hash storage operation is not considered, the first bit to the fourth bit or the first bit to the fifth bit may be determined as the effective bits corresponding to the first rule set.

In some embodiments, an effective bit of a rule may include all or a part of concerned bits of the rule.

In some embodiments, in order to reduce an operation amount caused by rule extension, the effective bit corresponding to the first rule set should not include an unconcerned bit of the rule as much as possible. In some embodiments, a rule #1 may be any one of the plurality of rules in the first rule set. If an effective bit of the rule #1 includes K unconcerned bits, during rule insertion, because a rule including "*" cannot be directly processed by using the hash function, the rule #1 should be extended, and hash storage is performed on extended $2^K$ rules one by one. In this case, if the rule #1 includes a relatively large quantity of unconcerned bits (e.g., a value of K is relatively large), a relatively large quantity of computing resources and storage resources need to be consumed.

It should be understood that, in this application, the basic effective bit determining principle is that values of different rules should have "uniqueness" as much as possible, and the effective bit corresponding to the first rule set should not include the unconcerned bit as much as possible. That the effective bit corresponding to the first rule set may be determined according to this principle does not mean that the values of the different rules on the effective bits in this embodiment of this application definitely have the "uniqueness" (e.g., are different from each other), and does not mean that the effective bit definitely do not include the unconcerned bit.

In some embodiments, the values of the different rules on the effective bits may be the same.

In some embodiments, the effective bit may include the unconcerned bit.

The first rule set may be stored in at least one storage unit based on a value of an effective bit of each rule in the first rule set. The storage unit may be a hash storage unit.

In this embodiment of this application, a hash key value of each rule may be determined based on the value of the effective bit of each rule in the first rule set, and each rule in the first rule set is stored in at least one storage unit based on the hash key value.

The storage unit may include a hash table, and the rule #1 may be any one of a plurality of rules in the first rule set. The following uses the rule #1 as an example to describe how to store the first rule set.

In some embodiments, a hash key value of the rule #1 may be determined based on a value of the effective bit of the rule #1, and a hash operation is performed based on the hash key value, to determine a storage location of the rule #1 in the hash table and store the rule #1 in the storage location. The hash key value of the rule #1 may be stored in the storage location. In some embodiments, the rule #1 may be stored in the storage location, and priority information of the rule #1 may be stored in the storage location.

During actual application, a corresponding mask configuration may be set for a storage unit. The mask configuration may set the hash key value corresponding to the rule #1 as follows: Only the value of the effective bit of the rule #1 is reserved, and a value of a bit other than the effective bit is replaced with "0".

In some embodiments, the storage unit may include a rule table, and each rule in the first rule set may be stored in the rule table. In some embodiments, the rule table may store priority information of each rule. In this case, an address index of the rule #1 in the rule table may be stored in the storage location.

In some embodiments, a hash operation is performed based on the hash key value of the rule #1, to determine a storage location of the rule #1 in the hash table. The storage location may be a row index (denoted as an index #1) in the hash table. In this case, the rule #1 or the address index of the rule #1 may be stored in a vacant slot in the row index #1.

In some embodiments, a rule #2 may be another rule in the first rule set, and a value of an effective bit of the rule #2 may be the same as the value of the effective bit of the rule #1. In this case, a storage location of the rule #2 in the hash table is determined. The storage location may be the index #1. In this case, the rule #2 or an address index of the rule #2 may be stored in another vacant slot in the row index #1.

In some embodiments, two hash operations may be performed based on the hash key value of the rule #1. The first hash operation is used to determine the storage location of the rule #1 in the hash table, and the second operation is used to determine fingerprint information of the rule #1 and store the fingerprint information in the storage location. In a next hash search process, the foregoing two hash operations may be performed on a search key. After fingerprint information of the search key is obtained through the second operation, matching and comparison may be performed between the fingerprint information of the search key and the fingerprint information in the storage location. Only when the two pieces of fingerprint information are the same, it can be determined that the storage location obtained through hash search is correct, and a subsequent rule matching operation is to be performed. The setting of the fingerprint information can reduce occurrence of a "hash conflict" problem, and improve accuracy of rule matching.

In some embodiments, to restrict that a rule table is to be matched for a maximum of one time, fingerprint information in different slots in a same row is different from each other, so that rule matching efficiency can be improved.

The foregoing describes how to store the first rule set. The first rule set is any one of the N rule sets. The N rule sets may be obtained by segmenting the initial rule set. The initial rule set may be segmented into the N rule sets in any manner, for example, by using methods such as HiCuts, HyperCuts, or Modular.

In some embodiments, the initial rule set may be divided into the N rule sets based on distribution characteristics of concerned bits.

For example, rules that have concerned bits whose distribution characteristics are the same or similar may be grouped into a same rule set. This can help determine an effective bit corresponding to the rule set.

It should be understood that the distribution characteristics of the concerned bits herein mainly relate to a quantity of the concerned bits and location characteristics, and that the distribution characteristics of the concerned bits are the same or similar mainly means that the quantities of the concerned bits and distribution locations of the concerned bits are the same or similar.

In order to store each configured rule, the N rule sets may be stored one by one, where determined effective bits of all rule sets may be the same or different.

If effective bits of a plurality of rule sets are the same, the plurality of rule sets may be stored in a same storage unit. In some embodiments, if a storage unit cannot store all rules in a rule set due to a small capacity, the rule set may be stored in a plurality of storage units. In the embodiments of this application, to facilitate next hash search, effective bits of rules stored in each storage unit are the same. In other words, during actual application, only one type of mask configuration is set for each storage unit.

In some embodiments, a plurality of rules in the first rule set correspond to a same hash key value (e.g., values of effective bits of the plurality of rules are the same, for example, the rule #1 and the rule #2). In this case, the plurality of rules may be stored in different storage units. During hash search, it may be avoided to search a plurality of slots in the same storage unit, especially when an address index of a rule in the rule table is stored in the slot. In this case, it may be avoided to search for the rule table in one storage unit for a plurality of times (e.g., a time period for searching for the rule table is relatively long). This can reduce a search delay and improve search efficiency.

Based on the preceding analysis, the N rule sets may be stored in S storage units, and a value of N may be greater than, equal to, or less than a value of S.

In some embodiments, a quantity of corresponding rule sets to be segmented may be determined based on a quantity of storage units adopted in a hardware design. That is, the quantity of rule sets (e.g., the value of N) may be equal to the quantity of storage units (e.g., the value of S). In this case, one rule set may correspond to one storage unit, each rule set corresponds to a different effective bit.

In some embodiments, the S storage units may be disposed in parallel, so that hash search efficiency can be improved.

Operation 230: When traffic classification is performed, search for a corresponding rule in each of the S storage units based on a hash key value of a search key.

In some embodiments, when traffic classification is performed, hash search is performed in each of the S storage units based on a hash key value of a search key: In each storage unit, an initial key value (e.g., the search key) is first converted into a corresponding hash key value of the storage unit by using a mask configuration that is set on the storage unit, and after a storage location is obtained by performing a hash operation on the storage unit, data information of the corresponding storage location is read to perform rule matching. If a plurality of rules are matched, a rule with a highest priority may be used as a return result.

If the rule is directly stored in the storage location, the rule in the storage location may be read, and rule matching is performed. In some embodiments, if an address index of the rule in the rule table is stored in the storage location, the address index in the storage location may be read, and is matches a rule indicated by the address index.

In some embodiments, two hash operations may be performed based on the hash key value. After fingerprint information of the search key is obtained through the second operation, matching and comparison may be performed between the fingerprint information of the search key and the fingerprint information in the storage location. Only when the two pieces of fingerprint information are the same, it can be determined that the storage location obtained through hash search is correct, and a subsequent rule matching operation is to be performed.

In the traffic classification method provided in this embodiment of this application, effective bits corresponding to different rule sets may be determined in a unit of a rule set, hash storage is performed on rules based on values that are on the effective bits and that are of the rules in the rule set, and the rules are stored in a plurality of storage units. Therefore, the traffic classification method provided in this embodiment features high search performance, low resource consumption, and a low search delay. In some embodiments, the traffic classification method provided in this embodiment of this application, through a combination of a proper rule set division method and a proper effective bit selection method, can greatly reduce a rule extension problem caused by an unconcerned bit "*" during rule insertion. During rule insertion, the rule extension needs to be performed based on only "*" on an effective bit of a current rule. This does not consume a relatively large quantity of computing resources and storage resources.

The following describes the traffic classification method provided in this application based on a specific example shown in Table 1. This embodiment may be considered as a further description of the foregoing embodiment. In this embodiment, how to divide an initial rule set and how to determine an effective bit corresponding to a rule set are mainly described.

TABLE 1

| Rule set | Rule | Source IP | Destination IP | Source port | Destination port | Protocol type |
|---|---|---|---|---|---|---|
| #1 | #1 | 10.22.132.90/32 | 0.0.0.0/0 | 0:65535 | 0:65535 | 0 |
|  | #2 | 10.33.5.0/28 | 0.0.0.0/0 | 0:65535 | 0:65535 | 0 |
|  | #3 | 10.116.7.0/24 | 0.0.0.0/0 | 0:65535 | 0:65535 | 0 |
|  | #4 | 10.3.18.64/26 | 0.0.0.0/0 | 0:65535 | 0:65535 | 0 |
|  | #5 | 10.72.2.64/26 | 0.0.0.0/0 | 0:65535 | 0:65535 | 0 |
| #2 | #6 | 0.0.0.0/0 | 10.3.52.0/24 | 0:65535 | 0:65535 | 0 |
|  | #7 | 0.0.0.0/0 | 10.33.17.0/25 | 0:65535 | 0:65535 | 0 |
|  | #8 | 0.0.0.0/0 | 10.22.37.72/32 | 0:65535 | 0:65535 | 0 |
|  | #9 | 0.0.0.0/0 | 10.22.39.0/27 | 0:65535 | 0:65535 | 0 |
|  | #10 | 0.0.0.0/0 | 10.8.7.1/32 | 0:65535 | 0:65535 | 0 |
|  | #11 | 0.0.0.0/0 | 10.2020.18/32 | 0:65535 | 0:65535 | 0 |
| #3 | #12 | 0.0.0.0/0 | 0.0.0.0/0 | 0:65535 | 135:135 | 0 × 06 |
|  | #13 | 0.0.0.0/0 | 0.0.0.0/0 | 0:65535 | 137:137 | 0 × 11 |

The initial rule set shown in Table 1 includes 13 rules in total. The 13 rules respectively are rules #1 to #13. In some embodiments, each rule includes five fields, namely, a source IP, a destination IP, a source port, a destination port, and a protocol type.

In some embodiments, for the rules #1 to #5, bits in the destination IP, source port, destination port, and protocol type are all unconcerned bits, and concerned bits of the foregoing five rules are mainly concentrated in the source IP field. In some embodiments, the concerned bits of the rules #1 to #5 are respectively the first 32 bits, 28 bits, 24 bits, 26 bits, and 26 bits in the source IP field (e.g., after being converted into binary bits).

In some embodiments, for the rules #6 to #11, bits in the source IP, source port, destination port, and protocol type are all unconcerned bits, and concerned bits of the foregoing six rules are mainly concentrated in the destination IP field. In some embodiments, the concerned bits of the rules #6 to #11 are respectively the first 24 bits, 25 bits, 32 bits, 27 bits, 32 bits, and 32 bits in the destination IP field (e.g., after being converted into binary bits).

In some embodiments, for the rules #12 and #13, bits in the source IP, destination IP, and source port are all unconcerned bits, and concerned bits of the foregoing two rules are mainly concentrated in the destination port field and the protocol type field.

Based on the foregoing analysis, to help subsequently determine an effective bit of a rule set, the initial rule set may be first divided based on distribution characteristics of the concerned bits of the initial rule set. In some embodiments, the concerned bits of the rules #1 to #5 are mainly concentrated in the source IP field, the concerned bits of the rules #6 to #11 are mainly concentrated in the destination IP field, and the concerned bits of the rules #12 and #13 are mainly concentrated in the destination port field and the protocol type field. Therefore, the initial rule set may be divided into three rule sets. The three rule sets are respectively a rule set #1 to a rule set #3, where the rule set #1 includes the rules #1 to #5, the rule set #2 includes the rules #6 to #11, and the rule set #3 includes the rules #12 and #13. In some embodiments, the foregoing three rule sets may be correspondingly stored in three storage units.

Second, an effective bit corresponding to each rule set is respectively determined. For the rule set #1, because the concerned bits of the rules #1 to #5 are all concentrated in the source IP field, an effective bit may be determined based on bits included in the source IP field.

In some embodiments, all 32 bits included in the source IP may be determined as the effective bits corresponding to the rule set #1. In this case, the effective bits corresponding to the rule set #1 are 32 bits in the source IP, values of the 32 bits included in the source IP of the rules #1 to #5 participate in a next hash storage operation, and values of other bits do not participate in the next hash storage operation. In some embodiments, for the rules #2 to #5, because the effective bits are only the first 28 bits, 24 bits, 26 bits, and 26 bits, rule extension needs to be performed when the unconcerned bits in the 32 bits in the source IP are inserted.

In some embodiments, to reduce a quantity of rule extension times, the first 24 bits in the source IP may be determined as the effective bits corresponding to the rule set #1. In this case, the effective bits of the rules #1 to #5 do not include the unconcerned bit. Therefore, the rule extension does not need to be performed during insertion. In this case, a mask configuration of a storage unit corresponding to the rule set #1 may be a mask 1 in Table 2. During insertion, a bitwise AND operation may be performed on the rules #1 to #5 and the mask 1. Values of the first 24 bits of each rule in the source IP are used as a hash key value that is of each rule and that is inserted into a hash table.

TABLE 2

| Mask | Source IP | Destination IP | Source port | Destination port | Protocol type |
|---|---|---|---|---|---|
| Mask #1 | 255.255.255.0 | 0.0.0.0 | 0x0000 | 0x0000 | 0x00 |
| Mask #2 | 0.0.0.0 | 255.255.255.0 | 0x0000 | 0x0000 | 0x00 |
| Mask #3 | 0.0.0.0 | 0.0.0.0 | 0x0000 | 0xFFFF | 0x00 |

In some embodiments, to reduce a calculation amount during rule insertion, a quantity of effective bits may be further reduced. In some embodiments, Table 1 shows a decimal source IP address. On the second bit of the decimal source IP address, values of the rules #1 to #5 are 22, 33, 116, 3, and 72 respectively, and are different from each other. Therefore, the second bit (e.g., the ninth to the sixteenth bits in the binary system) of the source IP address may be determined as the effective bit corresponding to the rule set #1. In this case, a mask #1 may be set to 0.255.0.0 0.0.0.0 0x0000 0x0000 0x00. In some embodiments, on the third bit of the decimal source IP address, values of rules #1 to #5 are 132, 5, 7, 18, and 2 respectively, and are different from each other. Therefore, the third bit (e.g., the seventeenth to twenty-fourth bits in the binary system) of the source IP address may be determined as the effective bit corresponding to the rule set #1. In this case, the mask #1 may be set to 0.0.255.0 0.0.0.0 0x0000 0x0000 0x00.

In some embodiments, for the rule set #2, because the concerned bits of the rules #6 to #11 are all concentrated in the destination IP field, an effective bit may be determined based on bits included in the destination IP field.

In some embodiments, all 32 bits included in the destination IP may be determined as the effective bit corresponding to the rule set #2.

In some embodiments, to reduce a quantity of rule extension times, the first 24 bits in the destination IP may be determined as the effective bit corresponding to the rule set #2. In this case, the effective bits of the rules #6 to #11 do not include the unconcerned bit. Therefore, the rule extension does not need to be performed during insertion. In this case, a mask configuration of a storage unit corresponding to the rule set #2 may be a mask 2 in Table 2. During insertion, a bitwise AND operation may be performed on the rules #6 to #11 and the mask 2.

In some embodiments, to reduce a calculation amount during rule insertion, a quantity of effective bits may be further reduced. In some embodiments, Table 1 shows a decimal destination IP address. On the third bit of the decimal destination IP address, values of the rules #6 to #11 are 52, 17, 37, 39, 7, and 20 respectively, and are different from each other. Therefore, the third bit (e.g., the seventeenth to the twenty-fourth bits in the binary system) of the destination IP address may be determined as the effective bit corresponding to the rule set #2. In this case, the mask #2 may be set to 0.0.0.0 0.0.255.0 0x0000 0x0000 0x00.

In some embodiments, for the rule set #3, because the concerned bits of the rules #12 and #13 are all concentrated in the destination port field and the protocol type field, an effective bit may be determined based on the bits included in the destination port field and the protocol type field.

In some embodiments, bits included in the destination port field may be determined as the effective bit corresponding to the rule set #3. In this case, a mask configuration of a storage unit corresponding to the rule set #3 may be a mask 3 in Table 2. During insertion, a bitwise AND operation may be performed on the rules #12 and #13 and the mask 3.

In some embodiments, bits included in the protocol type field may be determined as the effective bit corresponding to the rule set #3. In this case, the mask #3 may be set to 0.0.0.0 0.0.0.0 0x0000 0x0000 0xFF.

Third, after the foregoing three rule sets are correspondingly stored in the three storage units, the foregoing three storage units may be disposed in parallel to improve search efficiency.

Fourth, during traffic classification search, search may be performed in the foregoing three storage units at the same time based on a search key. In each storage unit, an initial key value is first converted into a corresponding hash key value of the storage unit by using a mask configuration that is set on the storage unit, and after a storage location is obtained by performing a hash operation on the storage unit, data information of the corresponding storage location is read to perform rule matching.

FIG. 5 is a logical structural diagram of a hash algorithm unit according to some embodiments. In FIG. 5, the hash algorithm unit provided in this embodiment of this application includes a mask module, an operation module, a hash table module, and a rule table module. An effective bit selected by a current hash algorithm unit to perform a hash operation is configured in the mask module. The mask module may convert a search key into a corresponding hash key value. The operation module is configured to perform the hash operation based on the hash key value. The hash table module stores rule content such as an address index and fingerprint information. The rule table is used to store complete rule information, to finally perform complete rule matching.

A working procedure of the hash algorithm unit shown in FIG. 5 is as follows: When a search key k1 is input into the hash algorithm unit, a bitwise AND (&) operation is first performed on the search key k1 and a mask configured by the mask module, to convert the search key k1 into a hash key value k2 of the hash table in the hash algorithm unit.

For example, the search key k1 may be 10111001 01011110, and the mask may be 11110000 00000000. In this case, after a bitwise AND operation is performed on the search key k1 and the mask, an obtained hash key value k2 is 10110000 00000000.

Subsequently, a first hash operation is performed on the hash key value k2 and a first hash function f1, to calculate a row index that is stored in the hash table and that is of the rule. In some embodiments, search is performed in a plurality of slots in the row. If a slot stores the hash key value k2 and stores an address index of the rule, the address index is used to indicate a location in the rule table module, and complete information of the related rule is stored in the location. In this case, the related rule may be used as a return result.

In some embodiments, to avoid a hash conflict, a second hash operation may be performed on the hash key value k2 and a second hash function f2, to calculate the fingerprint information of the rule, and compare the fingerprint information of the rule with fingerprint information in the slot. Only when the two are the same, it can be determined that the storage location obtained through the hash search is correct, and a next rule matching operation is to be performed.

Figure 6:
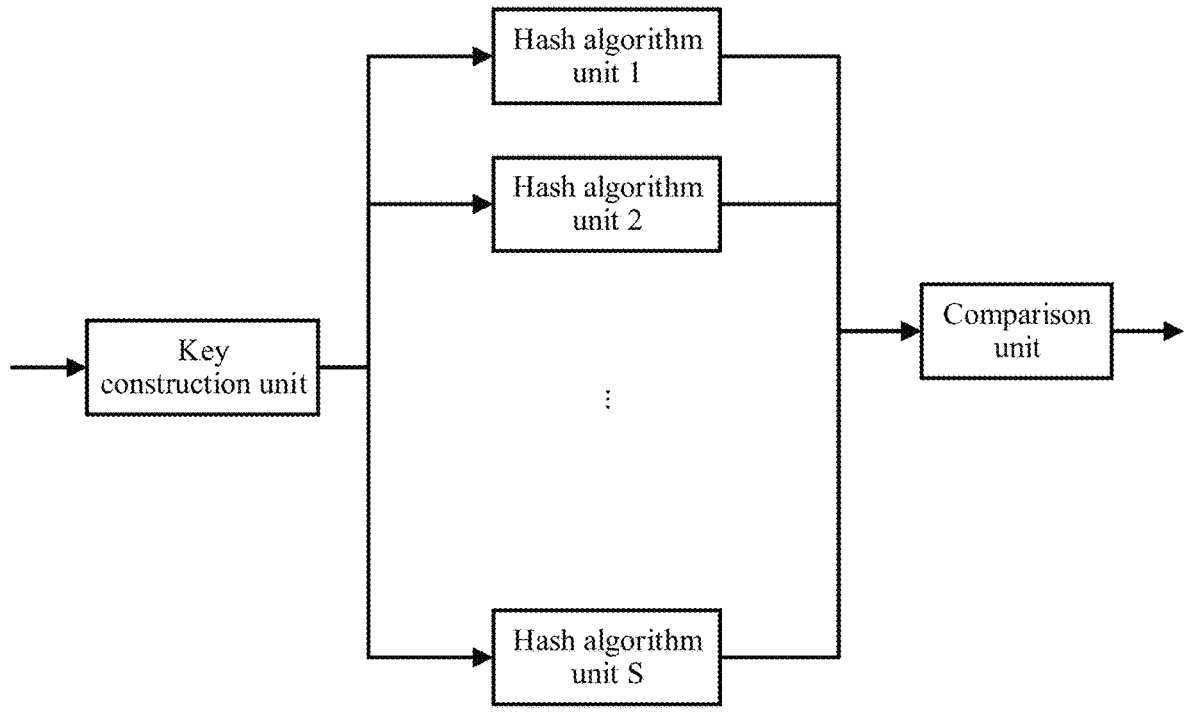
FIG. 6 is a schematic block diagram in which traffic classification search is implemented by parallel hash algorithm units according to some embodiments.

FIG. 6 is a schematic block diagram in which traffic classification search is implemented by parallel hash algorithm units according to some embodiments.

In FIG. 6, there are a total of S hash algorithm units that are disposed in parallel. A key construction unit extracts information of each field in a packet header and constructs a search key, and inputs the search key into the S parallel hash algorithm units to perform parallel search. In each hash algorithm unit, the search key is first converted into a corresponding hash key value of the hash algorithm unit by using the mask configured by the mask module; a hash operation is performed in the hash algorithm unit; and after an address is obtained, data information of the corresponding address is read, and rule matching and comparison are performed. If the matching succeeds, the rule is matched, and the rule is transmitted (e.g., sent, provided, delivered) to a comparison unit. If a plurality of rules are matched, the comparison unit is configured to compare priorities of the plurality of rules, and select a rule with a highest priority as an output result.

Figure 7:
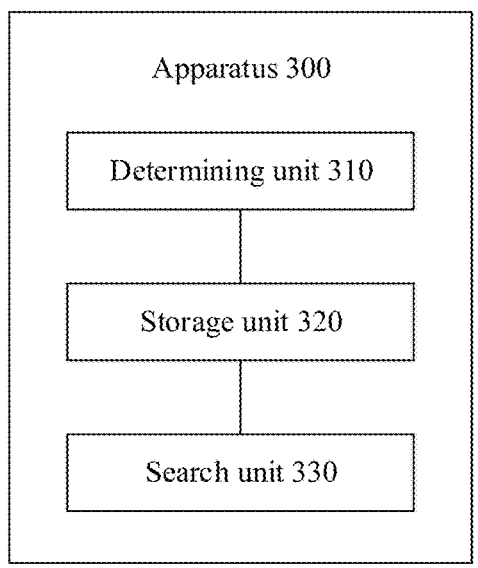
FIG. 7 is a schematic flowchart of a traffic classification search apparatus according to some embodiments.

FIG. 7 is a schematic flowchart of a traffic classification search apparatus 300 according to some embodiments. The traffic classification search apparatus 300 may be a traffic classification apparatus, or may be a chip or a circuit disposed in the traffic classification apparatus. For example, the traffic classification search apparatus 300 may be a router or a switch, or may be a chip in a router or a switch. As shown in FIG. 7, the traffic classification search apparatus 300 includes:

a determining unit 310, configured to determine, based on distribution characteristics of concerned bits of a plurality of rules in a first rule set, an effective bit corresponding to the first rule set, where the effective bit includes a bit on which values used to distinguish different rules in the plurality of rules are located;

a storage unit 320, configured to determine a hash key value of each rule based on a value of the effective bit of each rule in the first rule set, and store each rule in the first rule set in at least one of S storage units based on the hash key value, where the first rule set is any one of N rule sets, the N rule sets are stored in the S storage units, N and S are integers greater than or equal to 1, and effective bits of rules stored in each of the S storage units are the same; and a search unit 330, configured to, when traffic classification is performed, search for a corresponding rule in each of the S storage units based on a hash key value of a search key.

In some embodiments, the traffic classification search apparatus 300 includes a dividing unit that is configured to divide, based on distribution characteristics of concerned bits of an initial rule set, the initial rule set into the N rule sets.

In some embodiments, if the first rule set has a plurality of rules corresponding to a same hash key value, the storage unit 320 is configured to store the plurality of rules corresponding to the same hash key value in different storage units 320.

In some embodiments, each storage unit 320 includes a hash table and a rule table, and the storage unit 320 is configured to: store each rule in the first rule set in the rule table; and calculate, based on the hash key value of each rule, a storage location of each rule in the hash table, and store an address index of each rule in the rule table in the storage location.

In some embodiments, the storage unit 320 is configured to calculate fingerprint information of each rule based on the hash key value of each rule, and store the fingerprint information of each rule in the storage location.

The traffic classification search apparatus 300 shown in FIG. 7 may correspond to the traffic classification apparatus in the traffic classification method 200 according to the embodiments of this application. The traffic classification search apparatus 300 may include modules of methods performed by the traffic classification apparatus configured to perform the traffic classification method 200 in FIG. 4. In some embodiments, the modules in the traffic classification search apparatus 300 and the foregoing other operations and/or functions are separately used to implement corresponding procedures of the traffic classification method 200 in FIG. 4. A specific process in which the modules perform the foregoing corresponding operations is described in detail in the traffic classification method 200. For brevity, details are not described herein again.

Figure 8:
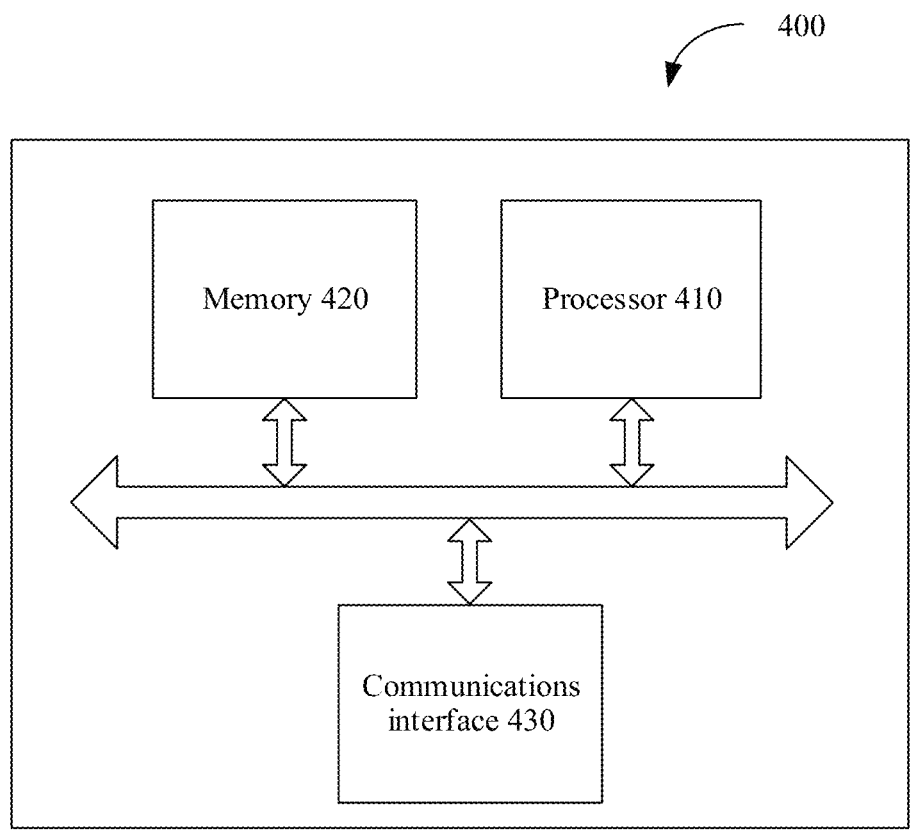
FIG. 8 is a schematic structural diagram of a traffic classification apparatus according to some embodiments.

FIG. 8 is a schematic structural diagram of a traffic classification apparatus 400 according to some embodiments. The traffic classification apparatus 400 may be a traffic classification apparatus, or may be a chip or a circuit disposed in the traffic classification apparatus. For example, the traffic classification apparatus 400 may be a router or a switch, or may be a chip in a router or a switch. As shown in FIG. 8, the traffic classification apparatus 400 includes a processor 410, a memory 420, and a communications interface 430. The memory 420 stores instructions. The processor 410 is configured to execute the instructions in the memory 420. When the instructions are executed, the processor 410 is configured to perform the method provided in the foregoing method embodiments. The processor 410 is configured to control the communications interface 430 to communicate with the outside.

In some embodiments, the processor 410, the memory 420, and the communications interface 430 may communicate with each other by using an internal connection path, to transfer a control signal and/or a data signal.

In some embodiments, the memory 420 may be integrated in the processor 410, or may be disposed separately from the processor 410.

In some embodiments, the traffic classification apparatus 400 may be configured to perform operations in the traffic classification method 200 in FIG. 4. The traffic classification apparatus 400 may include modules of methods performed by the traffic classification apparatus configured to perform the traffic classification method 200 in FIG. 4. In some embodiments, the modules in the traffic classification apparatus 400 and the foregoing other operations and/or functions are separately used to implement corresponding procedures of the traffic classification method 200 in FIG. 4. A specific process in which the modules perform the foregoing corresponding operations is described in detail in the traffic classification method 200. For brevity, details are not described herein again.

An embodiment of this application further provides a computer-readable storage medium. The computer-readable storage medium includes a computer program. When the computer program is run on a computer, the computer is enabled to perform the method according to the foregoing method embodiments.

An embodiment of this application further provides a computer program product including instructions. When the computer program product is run on a computer, the computer is enabled to perform the method according to the foregoing method embodiments.

An embodiment of this application further provides a chip system, including a memory and a processor. The memory is configured to store a computer program. The processor is configured to invoke the computer program from the memory and run the computer program, so that a network device on which the chip system is installed performs the method according to the foregoing method embodiments.

The chip system may include an input circuit or interface configured to send information or data, and an output circuit or interface configured to receive (e.g., retrieve, obtain, acquire) information or data.

It should be understood that, the processor in the embodiments of this application may be a central processing unit (CPU), or may further be another general-purpose processor, a digital signal processor (DSP), an application-specific integrated circuit (ASIC), a field programmable gate array (FPGA), or another programmable logic device, a discrete gate or transistor logic device, a discrete hardware component, or the like. The general-purpose processor may be a microprocessor, or the processor may be any conventional processor or the like.

It may be understood that the memory in the embodiments of this application may be a volatile memory or a nonvolatile memory, or may include a volatile memory and a nonvolatile memory. The nonvolatile memory may be a read-only memory (ROM), a programmable read-only memory (PROM), an erasable programmable read-only memory (EPROM), an electrically erasable programmable read-only memory (EEPROM), or a flash memory. The volatile memory may be a random access memory (RAM), used as an external cache. Through example but not restrictive description, many forms of random access memories (RAM) are available, for example, a static random access memory (SRAM), a dynamic random access memory (DRAM), a synchronous dynamic random access memory (SDRAM), a double data rate synchronous dynamic random access memory (DDR SDRAM), an enhanced synchronous dynamic random access memory (ESDRAM), a synchlink dynamic random access memory (SLDRAM), and a direct rambus dynamic random access memory (DR RAM).

A person of ordinary skill in the art may be aware that, in combination with the examples described in the embodiments disclosed in this specification, units and algorithm operations may be implemented by electronic hardware or a combination of computer software and electronic hardware. Whether the functions are performed by hardware or software depends on particular applications and design constraint conditions of the technical solutions. A person skilled in the art may use different methods to implement the described functions for each particular application, but it should not be considered that the implementation goes beyond the scope of this application.

It may be clearly understood by a person skilled in the art that, for the purpose of convenient and brief description, for a detailed working process of the foregoing system, apparatus, and unit, refer to a corresponding process in the foregoing method embodiments, and details are not described herein again.

In the several embodiments provided in this application, it should be understood that the disclosed system, apparatus, and method may be implemented in other manners. For example, the described apparatus embodiment is merely an example. For example, the unit division is merely logical function division and may be other division during actual implementation. For example, a plurality of units or components may be combined or integrated into another system, or some features may be ignored or not performed. In some embodiments, the displayed or discussed mutual couplings or direct couplings or communication connections may be implemented through some interfaces. The indirect couplings or communication connections between the apparatuses or units may be implemented in electronic, mechanical, or other forms.

The units described as separate parts may or may not be physically separate, and parts displayed as units may or may not be physical units, may be located in one position, or may be distributed on a plurality of network units. Some or all of the units may be selected based on actual requirements to achieve the objectives of the solutions of the embodiments.

In some embodiments, functional units in the embodiments of this application may be integrated into one processing unit, or each of the units may exist alone physically, or two or more units are integrated into one unit.

When the functions are implemented in the form of a software functional unit and sold or used as an independent product, the functions may be stored in a computer-readable storage medium. Based on such an understanding, the technical solutions of this application essentially, or the part contributing to the conventional technology, or some of the technical solutions may be implemented in a form of a software product. The software product is stored in a storage medium, and includes several instructions for instructing a computer device (e.g., which may be a personal computer, a server, or a network device) to perform all or some of the operations of the methods described in the embodiments of this application. The foregoing storage medium includes:

any medium that can store program code, such as a USB flash drive, a removable hard disk, a read-only memory (ROM), a random access memory (RAM), a magnetic disk, or an optical disc.

The foregoing descriptions are merely specific implementations of this application, but are not intended to limit the protection scope of this application. Any variation or replacement readily figured out by a person skilled in the art within the technical scope disclosed in this application shall fall within the protection scope of this application. Therefore, the protection scope of this application shall be subject to the protection scope of the claims. The foregoing descriptions are merely specific implementations of the present application, but are not intended to limit the protection scope of the present application. Any variation or replacement readily figured out by a person skilled in the art within the technical scope disclosed in the present application shall fall within the protection scope of the present application. Therefore, the protection scope of the present application shall be subject to the protection scope of the claims.

What is claimed is:

1. A traffic classification method, comprising:
   determining, based on distribution characteristics of concerned bits of a plurality of rules in a first rule set, an effective bit corresponding to the first rule set;
   determining a hash key value of each rule based on a value of the effective bit of each rule in the first rule set, and storing each rule in the first rule set in at least one of S storage units based on the hash key value, wherein the first rule set is any one of N rule sets, the N rule sets are stored in the S storage units, N and S are integers greater than or equal to 1, and effective bits of rules stored in each of the S storage units are the same; and
   when traffic classification is performed, searching for a corresponding rule in each of the S storage units based on a hash key value of a search key.

2. The method of claim 1, wherein the effective bit comprises a bit on which values used to distinguish different rules in the plurality of rules are located, and wherein before the determining, based on distribution characteristics of concerned bits of a plurality of rules in a first rule set, an effective bit corresponding to the first rule set, the method further comprises:
   dividing, based on distribution characteristics of concerned bits of an initial rule set, the initial rule set into the N rule sets.

3. The method of claim 1, wherein if the first rule set has a plurality of rules corresponding to a same hash key value, the storing each rule in the first rule set in at least one of S storage units based on the hash key value comprises:
   storing the plurality of rules corresponding to the same hash key value in different storage units.

4. The method of claim 1, wherein the S storage units are disposed in parallel.

5. The method of claim 1, wherein each storage unit comprises a hash table and a rule table; and
   the storing each rule in the first rule set in at least one of S storage units based on the hash key value comprises:
   storing each rule in the first rule set in the rule table; and
   calculating, based on the hash key value of each rule, a storage location of each rule in the hash table, and storing an address index of each rule in the rule table in the storage location.

6. The method of claim 5, wherein the storing each rule in the first rule set in at least one of S storage units based on the hash key value comprises:
   calculating fingerprint information of each rule based on the hash key value of each rule, and storing the fingerprint information of each rule in the storage location.

7. A traffic classification apparatus, comprising:
   a non-transitory memory storing instructions; and
   a processor coupled to the non-transitory memory; wherein the instructions, when executed by the processor, cause the traffic classification apparatus to be configured to:
   determine, based on distribution characteristics of concerned bits of a plurality of rules in a first rule set, an effective bit corresponding to the first rule set;
   determine a hash key value of each rule based on a value of the effective bit of each rule in the first rule set, and store each rule in the first rule set in at least one of S storage units based on the hash key value, wherein the first rule set is any one of N rule sets, the N rule sets are stored in the S storage units, N and S are integers greater than or equal to 1, and effective bits of rules stored in each of the S storage units are the same; and
   when traffic classification is performed, search for a corresponding rule in each of the S storage units based on a hash key value of a search key.

8. The traffic classification apparatus of claim 7, wherein the effective bit comprises a bit on which values used to distinguish different rules in the plurality of rules are located, and wherein the instructions, when executed by the processor, further cause the traffic classification apparatus to be configured to:
   divide, based on distribution characteristics of concerned bits of an initial rule set, the initial rule set into the N rule sets.

9. The traffic classification apparatus of claim 7, wherein the instructions, when executed by the processor, further cause the traffic classification apparatus to be configured to:
   if the first rule set has a plurality of rules corresponding to a same hash key value, store the plurality of rules corresponding to the same hash key value in different storage units.

10. The traffic classification apparatus of claim 7, wherein the S storage units are disposed in parallel.

11. The traffic classification apparatus of claim 7, wherein each storage unit comprises a hash table and a rule table, and the instructions, when executed by the processor, further cause the traffic classification apparatus to be configured to:
    store each rule in the first rule set in the rule table; and
    calculate, based on the hash key value of each rule, a storage location of each rule in the hash table, and store an address index of each rule in the rule table in the storage location.

12. The traffic classification apparatus of claim 11, wherein the instructions, when executed by the processor, further cause the traffic classification apparatus to be configured to:
    calculate fingerprint information of each rule based on the hash key value of each rule, and store the fingerprint information of each rule in the storage location.

13. An integrated circuit, wherein the integrated circuit comprises a control circuit and an interface circuit, wherein the control circuit is configured to:
    determine, based on distribution characteristics of concerned bits of a plurality of rules in a first rule set, an effective bit corresponding to the first rule set;
    determine a hash key value of each rule based on a value of the effective bit of each rule in the first rule set, and store each rule in the first rule set in at least one of S storage units based on the hash key value, wherein the first rule set is any one of N rule sets, the N rule sets are stored in the S storage units, N and S are integers greater than or equal to 1, and effective bits of rules stored in each of the S storage units are the same; and when traffic classification is performed, search for a corresponding rule in each of the S storage units based on a hash key value of a search key.

14. The integrated circuit of claim 13, wherein the effective bit comprises a bit on which values used to distinguish different rules in the plurality of rules are located, and wherein the control circuit is further configured to:

divide, based on distribution characteristics of concerned bits of an initial rule set, the initial rule set into the N rule sets.

15. The apparatus of claim 13, wherein the control circuit is further configured to:

if the first rule set has a plurality of rules corresponding to a same hash key value, store the plurality of rules corresponding to the same hash key value in different storage units.

16. The apparatus of claim 13, wherein the S storage units are disposed in parallel.

17. The apparatus of claim 13, wherein each storage unit comprises a hash table and a rule table, and the control circuit is further configured to:

store each rule in the first rule set in the rule table; and calculate, based on the hash key value of each rule, a storage location of each rule in the hash table, and store an address index of each rule in the rule table in the storage location.

18. The apparatus of claim 17, wherein the control circuit is further configured to:

calculate fingerprint information of each rule based on the hash key value of each rule, and store the fingerprint information of each rule in the storage location.

* * * * *